United States Patent
Lee

(10) Patent No.: US 11,006,760 B2
(45) Date of Patent: May 18, 2021

(54) CONVERTIBLE SEATING UNIT AND SEATING ARRANGEMENT

(71) Applicant: James Shing Hin Lee, Kowloon (HK)

(72) Inventor: James Shing Hin Lee, Kowloon (HK)

( * ) Notice: Subject to any disclaimer, the term of this patent is extended or adjusted under 35 U.S.C. 154(b) by 348 days.

(21) Appl. No.: 15/770,011

(22) PCT Filed: Oct. 8, 2016

(86) PCT No.: PCT/CN2016/101471
§ 371 (c)(1),
(2) Date: Apr. 20, 2018

(87) PCT Pub. No.: WO2017/067383
PCT Pub. Date: Apr. 27, 2017

(65) Prior Publication Data
US 2020/0245772 A1    Aug. 6, 2020

Related U.S. Application Data

(60) Provisional application No. 62/243,730, filed on Oct. 20, 2015.

(51) Int. Cl.
*A47C 11/00*    (2006.01)
*B64D 11/06*    (2006.01)
(Continued)

(52) U.S. Cl.
CPC ............. *A47C 11/005* (2013.01); *A47C 7/40* (2013.01); *B60N 2/3011* (2013.01); *B64D 11/0639* (2014.12)

(58) Field of Classification Search
CPC ..... A47C 11/005; A47C 7/40; B64D 11/0639; B60N 2/3011
(Continued)

(56) References Cited

U.S. PATENT DOCUMENTS

| 4,536,027 | A | 8/1985 | Brennan |
| 6,793,282 | B2 | 9/2004 | Plant et al. |

(Continued)

FOREIGN PATENT DOCUMENTS

| CN | 101454203 | 6/2009 |
| DE | 43 36 710 A1 | 4/1994 |

(Continued)

OTHER PUBLICATIONS

International Search Report Application No. PCT/CN2016/101471 Completed: Dec. 19, 2016; dated Jan. 5, 2017 2 pages.
(Continued)

*Primary Examiner* — Mark R Wendell
(74) *Attorney, Agent, or Firm* — Ware, Fressola, Maguire & Barber LLP

(57) ABSTRACT

A seating unit (102, 104) is disclosed as including a seat (106, 110) with a seat back (106a, 110a) and a seat pan (106c, 110c) which are movable relative to each other to convert the seat (106, 110) between a sittable configuration and an un-sittable configuration, and a seat (108) with a seat back (108a) and a seat pan (108c), the angle subtended by the seat back (106a, 110a) and the seat pan (106c, 110c) when the seat (106, 110) is in the sittable configuration being larger than an angle subtended by the seat back (106a, 110a) and the seat pan (106c, 110c) when the seat (106, 110) is in the un-sittable configuration, the seat back (106a, 110a) of the seat (106, 110) and the seat back (108a) of the seat (108) being connected with each other by a web (120, 122).

8 Claims, 6 Drawing Sheets

(51) Int. Cl.
    *A47C 7/40*  (2006.01)
    *B60N 2/30*  (2006.01)
(58) Field of Classification Search
    USPC .................................................. 297/248, 249
    See application file for complete search history.

(56) References Cited

U.S. PATENT DOCUMENTS

| | | | | |
|---|---|---|---|---|
| 7,918,504 | B2* | 4/2011 | Thompson | ......... B64D 11/0606 |
| | | | | 297/248 |
| 9,764,663 | B2* | 9/2017 | Lee | ......... B60N 2/242 |
| 2003/0094840 | A1* | 5/2003 | Williamson | ......... B64D 11/064 |
| | | | | 297/248 |
| 2004/0051003 | A1 | 3/2004 | Cheung | |
| 2007/0241232 | A1* | 10/2007 | Thompson | ............. B64D 11/04 |
| | | | | 244/118.6 |
| 2008/0224510 | A1* | 9/2008 | Hankinson | ......... B64D 11/0601 |
| | | | | 297/248 |
| 2009/0121523 | A1 | 5/2009 | Johnson | |
| 2010/0252680 | A1* | 10/2010 | Porter | ............. B64D 11/00151 |
| | | | | 244/118.6 |
| 2013/0320731 | A1 | 12/2013 | Liu et al. | |
| 2014/0300145 | A1 | 10/2014 | Beroth et al. | |
| 2015/0197209 | A1* | 7/2015 | Fujiwara | ............... B60R 21/231 |
| | | | | 280/730.1 |
| 2017/0015420 | A1* | 1/2017 | Henshaw | ........... B64D 11/0626 |

FOREIGN PATENT DOCUMENTS

| | | |
|---|---|---|
| DE | 102 24 048 A1 | 12/2003 |
| GB | 2387535 | 10/2003 |
| JP | 57-80327 U | 5/1982 |
| JP | 2007534533 | 11/2007 |
| WO | 2013/181795 A1 | 12/2013 |

OTHER PUBLICATIONS

Extended European Search Report, including the supplementary European search report and the European search opinion, Application No. 16856816.0-1010 /3365231 PCT/CN2016101471, 8 pages.
Japanese Office Action, application No. 2018-540199, dated Aug. 21, 2020, 3 pages.
English translation of Japanese Office Action, application No. 2018-540199, dated Aug. 21, 2020, 5 pages.
Machine translation provided by J-PlatPat of [Utility Model Claims], [Brief Description of the Drawings], and [Detailed description of the device], Foreign Patent Document Cite No. 1 (JP 57-80327 U), 2 pages.

* cited by examiner

CONVERTIBLE SEATING UNIT AND SEATING ARRANGEMENT

CROSS-REFERENCE TO RELATED APPLICATIONS

This application is the U.S. national stage of international application number PCT/CN2016/101471 filed 8 Oct. 2016 and claims benefit of U.S. provisional application No. 62/243,730 filed 20 Oct. 2015.

BACKGROUND OF THE INVENTION

This invention relates to a convertible seating unit and a seating arrangement incorporating such a convertible seating unit suitable for, but not limited to, use on transportation vehicles, e.g. aircraft.

It is common to arrange for more than one class of cabins in an aircraft. In addition to the relatively densely packed economy class, there is usually a separate cabin area for premium class (or business class) with a lower seating density, giving a greater seating width and legroom to satisfy passengers who can afford a higher budget.

The configuration of such cabins, i.e. the proportion between economy class and premium class is often fixed and cannot be modified quickly and easily. On the other hand, it is of course the case that demand for seats in the economy class and that for seats in the premium class vary across different flights and different seasons. As one fixed configuration cannot fit all the flights or adapt to varying demands for premium seats and economy seats, an airline company cannot operate to maximize its profit.

Convertible seating units have been proposed. Such seating units may be converted into seat arrangements of different seating densities, usually by adjusting the width of the seats by varying the number of seats in each row. For example, U.S. Pat. No. 6,715,716 discloses a seat assembly in which part of a back portion of a seat of a front row is movable to form a leg support for a seat of an adjacent rear row.

However, although more legroom is available in the seat assembly of U.S. Pat. No. 6,715,716, such is only suitable for sleeping posture, which a passenger may not wish to adopt during most of the flight time. For hygiene reasons, passengers may not wish to occupy a seat which can be converted into a leg support. In any event, thorough cleaning of the seat of the front row is a must. Furthermore, such prior art convertible seating units do not provide sufficient differentiation between the economy-class configuration and the business-class configuration.

BRIEF SUMMARY OF THE INVENTION

It is thus an object of the present invention to provide a convertible seating unit, a seating arrangement incorporating such a convertible seating unit, and a transportation vehicle incorporating such a seating arrangement in which the aforesaid shortcomings are mitigated, or at least to provide a useful alternative to the trade and public.

According to a first aspect of the present invention, there is provided a seating unit including a first seat with a first back member and a first seat pan member which are movable relative to each other to convert said first seat between a first configuration and a second configuration, and a second seat with a second back member and a second seat pan member, wherein an angle subtended by said first back member and said first seat pan member when said first seat is in said first configuration is larger than an angle subtended by said first back member and said first seat pan member when said first seat is in said second configuration, and wherein said first back member of said first seat and said second back member of said second seat are connected with each other by a web member.

According to a second aspect of the present invention, there is provided a seating arrangement including at least two seating units, wherein one of said seating units is positioned in front of the other of said seating units, and wherein at least one of said seating units includes a first seat with a first back member and a first seat pan member which are movable relative to each other to convert said first seat between a first configuration and a second configuration, and a second seat with a second back member and a second seat pan member, wherein an angle subtended by said first back member and said first seat pan member when said first seat is in said first configuration is larger than an angle subtended by said first back member and said first seat pan member when said first seat is in said second configuration, and wherein said first back member of said first seat and said second back member of said second seat are connected with each other by a web member.

A seating unit according to an embodiment of the present invention and a seating arrangement incorporating such a seating unit will now be described, by way of an example only, with reference to the accompanying drawings, in which:

DETAILED DESCRIPTION OF THE INVENTION

Figure 1:
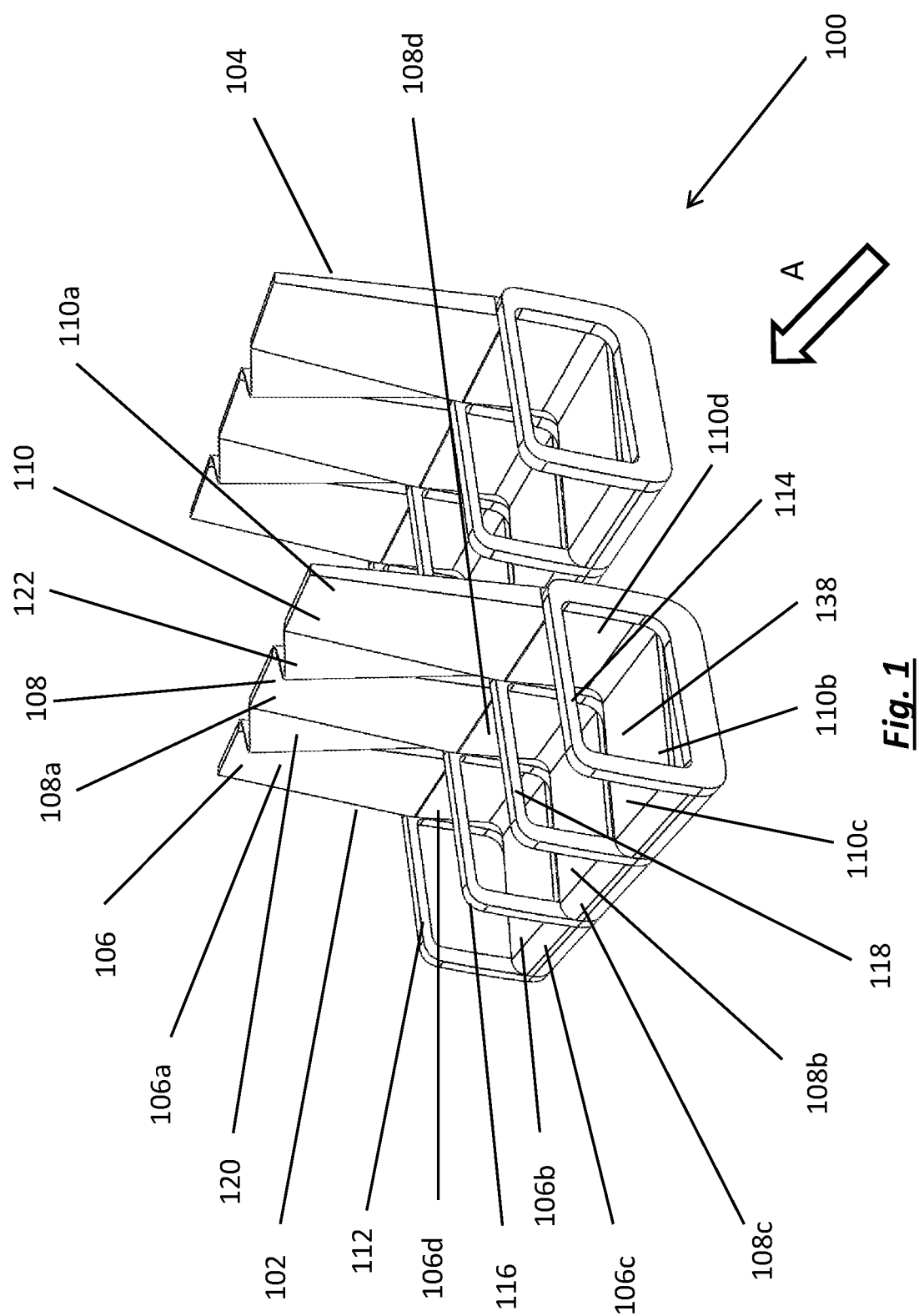
FIG. 1 is a schematic front perspective view of a seating arrangement, incorporating two seating units according to the present invention, one positioned in front of the other, with all the seats in a sittable configuration.
Figure 2:
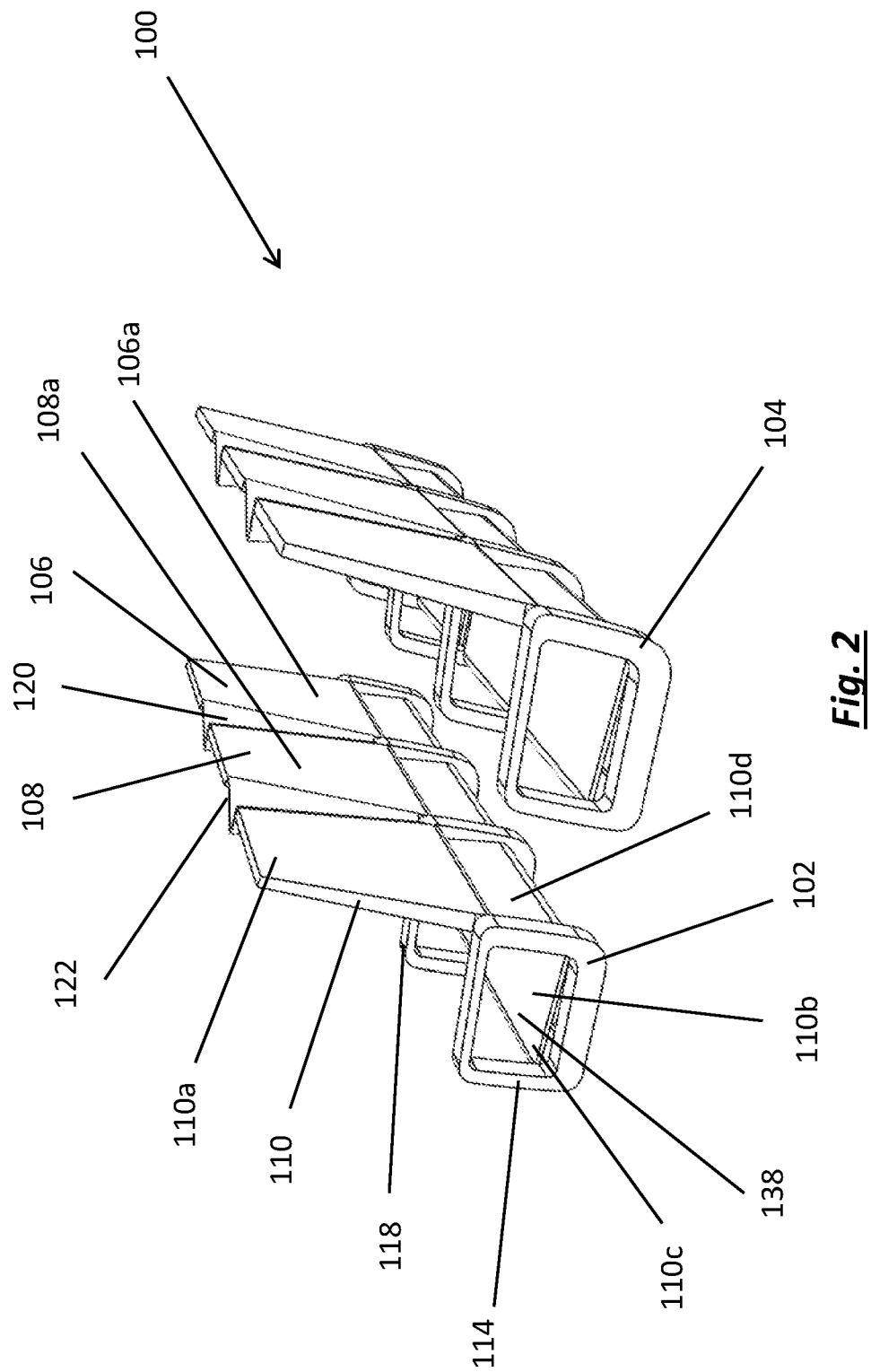
FIG. 2 is a rear perspective view of the seating arrangement of FIG. 1.
Figure 3:
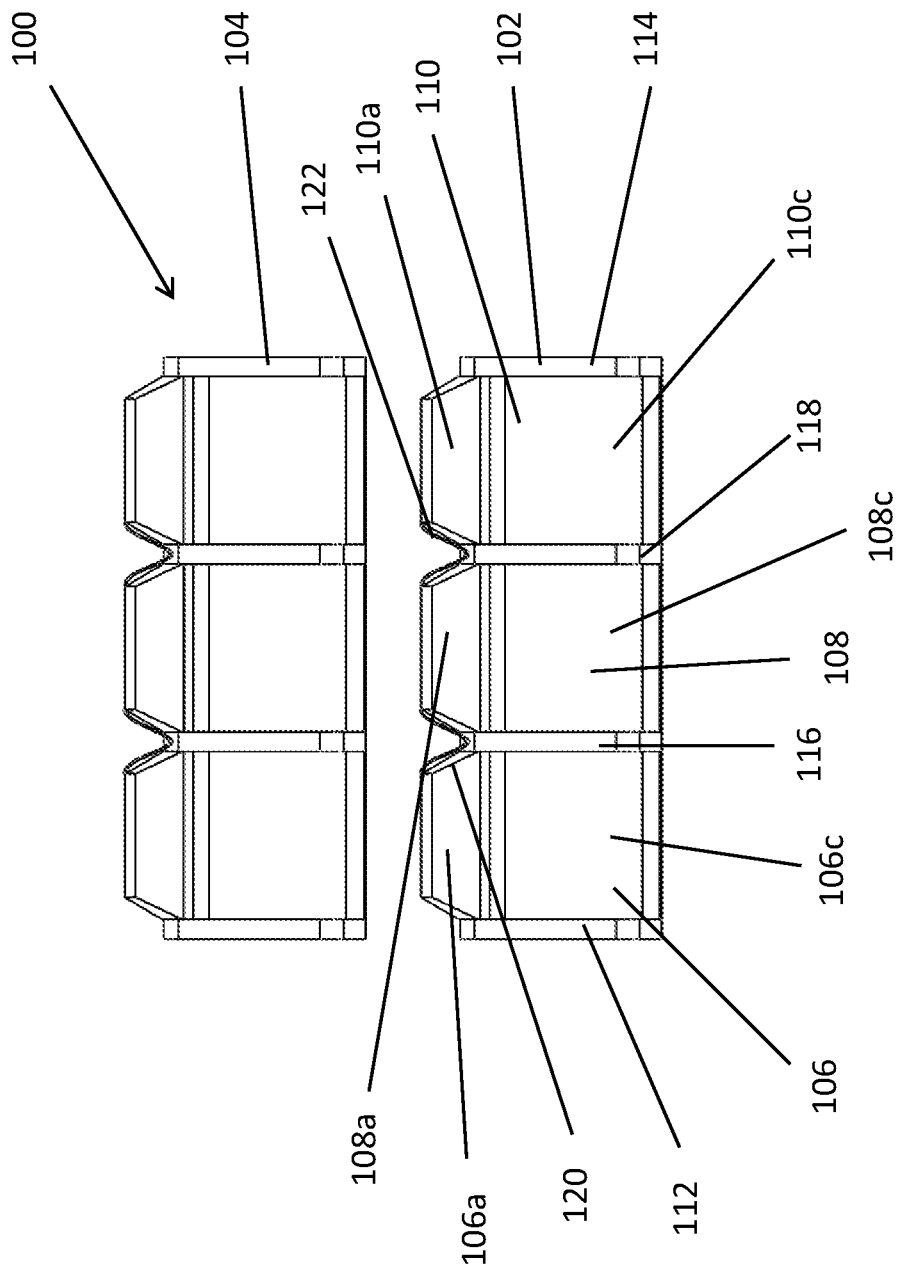
FIG. 3 is a top view of the seating arrangement of FIG. 1.

FIGS. 1 to 3 show a seating arrangement, generally designated as 100, including two seating units 102, 104, with the seating unit 102 positioned in front of the seating unit 104, and facing a same direction. As both seating units 102, 104 are similarly structured, the ensuing discussion will be focused on the seating unit 102.

The seating unit 102 includes three seats 106, 108, 110 arranged side by side with each other in a row and facing a same direction. The seat 106 has an upwardly extending seat back 106*a* and a seat portion 106*b*. The seat portion 106*b* has a generally horizontal seat pan 106*c* integrally joined with an upwardly extending lower back portion 106*d* to form a structure which is in the general shape of a letter "L" turned anti-clockwise by around ninety degrees when viewed in the direction indicated by the arrow A in FIG. 1. Similarly, the seat 108 has an upwardly extending seat back 108*a* and a seat portion 108*b*. The seat portion 108*b* has a generally horizontal seat pan 108*c* integrally joined with an upwardly extending lower back portion 108d. The seat 110 has an upwardly extending seat back 110a and a seat portion 110b. The seat portion 110b has a generally horizontal seat pan 110c integrally joined with an upwardly extending lower back portion 110d.

On an outside of the seat 106 (i.e. the side of the seat 106 away from the seats 108, 110) is an armrest 112; and on an outside of the seat 110 (i.e. the side of the seat 110 away from the seats 106, 108) is an armrest 114. Between the seat 106 and the seat 108 is an armrest 116; and between the seat 108 and the seat 110 is an armrest 118.

Between and connecting the seat back 106a of the seat 106 and the seat back 108a of the seat 108 is a web 120; and between and connecting the seat back 108a of the seat 108 and the seat back 110a of the seat 110 is a web 122. Both the webs 120, 122 are made of a flexible material, such as cloth or leather.

Figure 4:
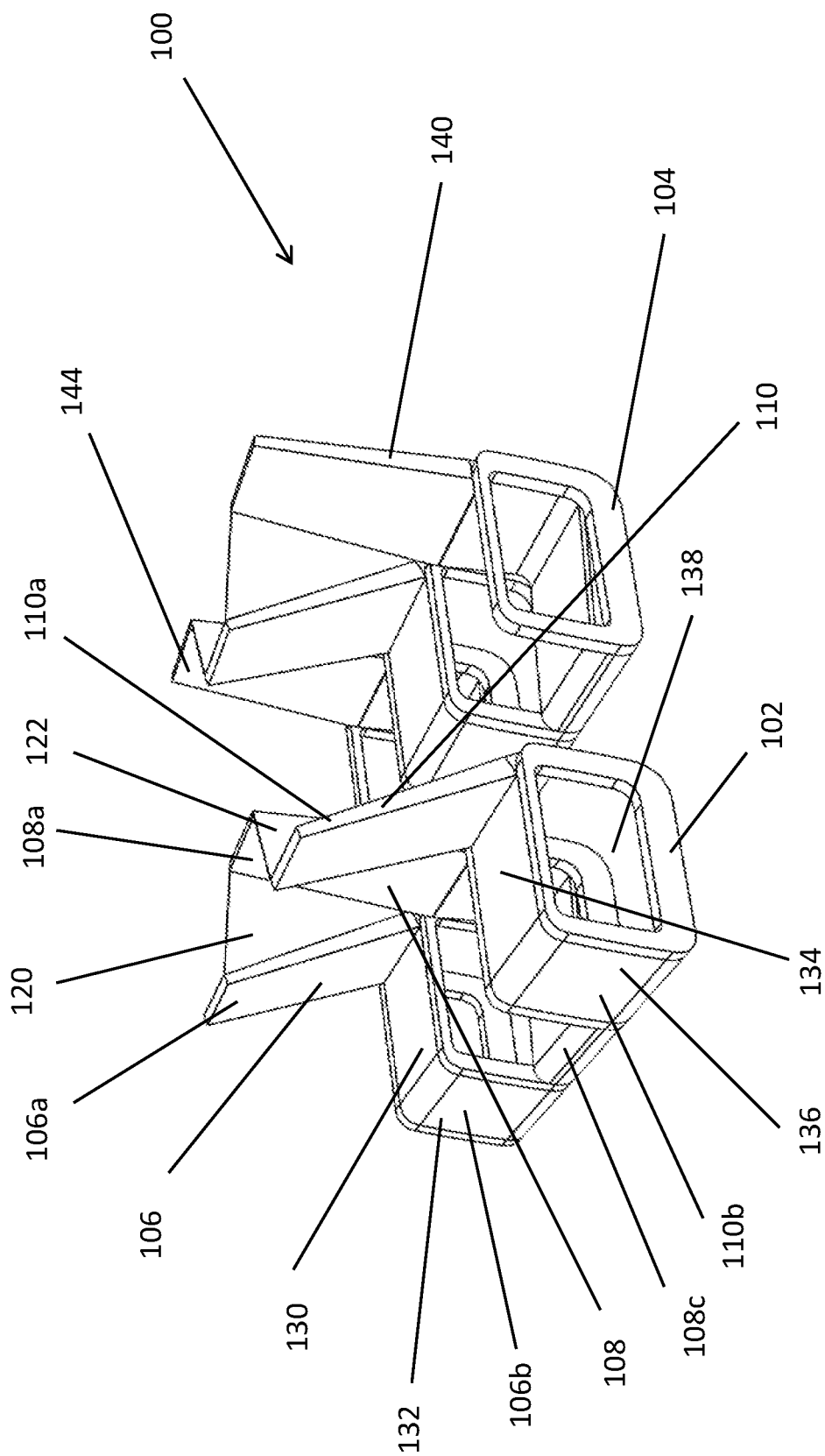
FIG. 4 is a schematic front perspective view of the seating arrangement of FIG. 1, with some of the seats of the seating units in an un-sittable configuration.
Figure 5:
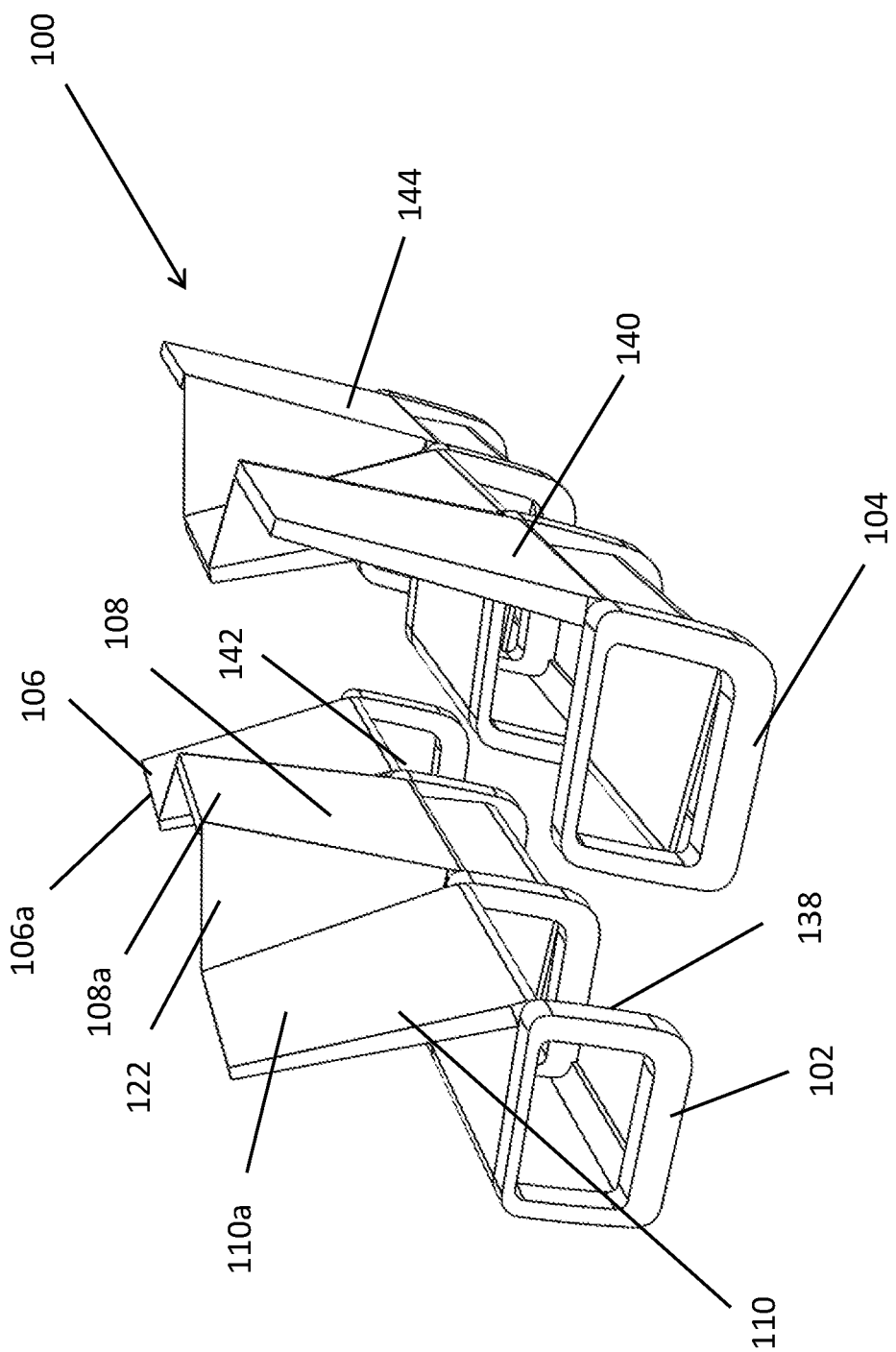
FIG. 5 is a rear perspective view of the seating arrangement of FIG. 4.
Figure 6:
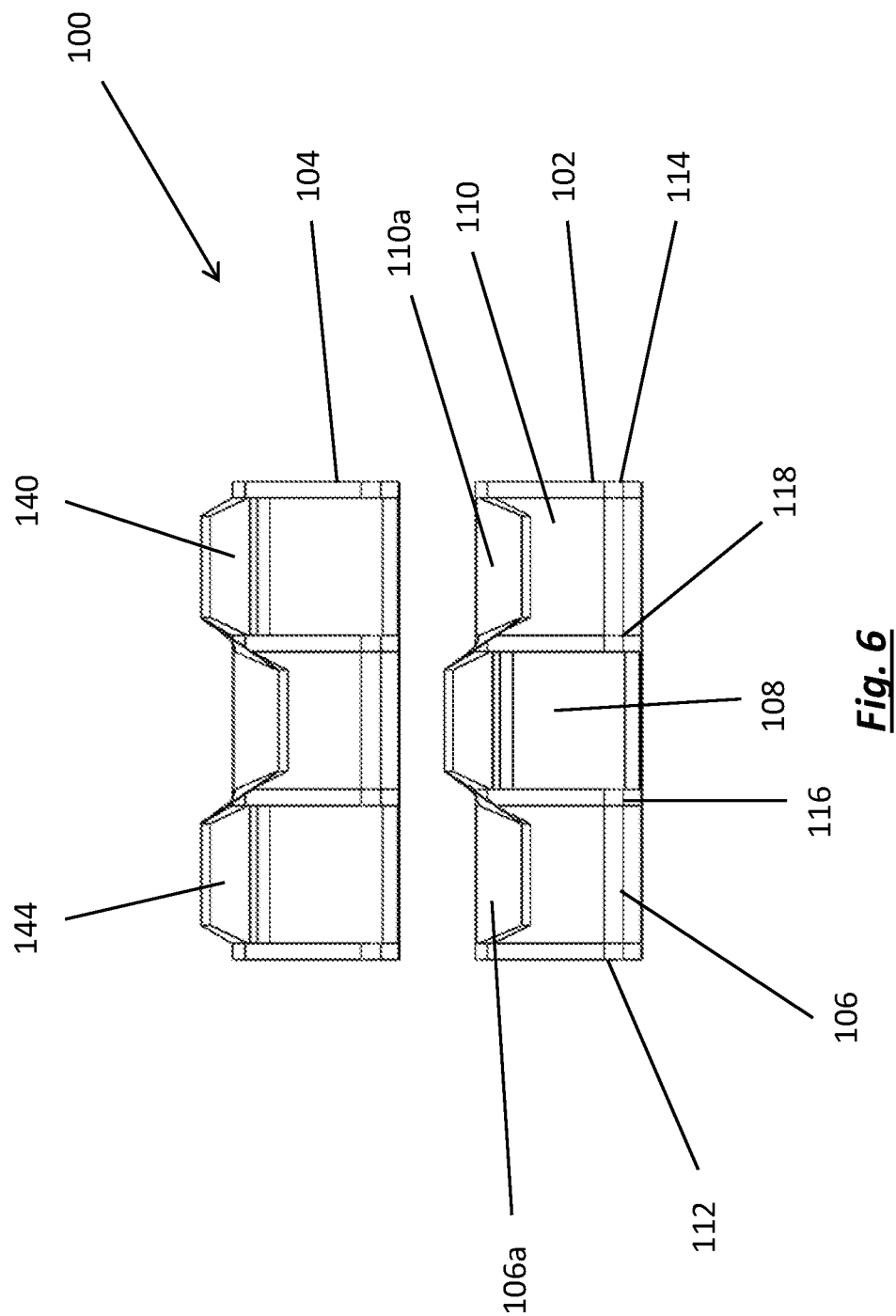
FIG. 6 is a top view of the seating arrangement of FIG. 4.

Turning now to FIGS. 4 to 6, it can be seen that at least the seats 106, 110 are convertible from the configuration shown in FIGS. 1 to 3 to that shown in FIGS. 4 to 6. The configuration of the seats 106, 110 shown in FIGS. 1 to 3 is called "sittable configuration" (as it is suitable for sitting on by an occupant), and the configuration of the seats 106, 110 shown in FIGS. 4 and 6 is called "un-sittable configuration". In respect of the term "un-sittable configuration", although an occupant may sit on the seat 106 even in its un-sittable configuration, it is not comfortable to do so and thus such a configuration is called "un-sittable configuration".

It can be seen that when the seat 106 is in the sittable configuration as shown in FIGS. 1 to 3, the seat back 106a extends upwardly and is vertical or tilted backward. It may be pivoted forward relative to the seat pan 106c (and relative to the seat back 108a and seat pan 108c of the adjacent seat 108) to the position as shown in FIGS. 4 to 6 in which it extends upwardly and tilted forward, in which the seat 106 is in the un-sittable configuration. When the seat 106 is in the sittable configuration, the angle subtended by the seat back 106a and the seat pan 106c is a right angle or obtuse angle, and when the seat 106 is in the un-sittable configuration, the angle subtended by the seat back 106a and the seat pan 106c is an acute angle. Put another way, the angle subtended by the seat back 106a and the seat pan 106c is larger when the seat 106 is in the sittable configuration than when the seat 106 is in the un-sittable configuration.

Similarly, when the seat 110 is in the sittable configuration as shown in FIGS. 1 to 3, the seat back 110a extends upwardly and is vertical or tilted backward. It may be pivoted forward relative to the seat pan 110c (and relative to the seat back 108a and seat pan 108c of the adjacent seat 108) to the position as shown in FIGS. 4 to 6 in which it extends upwardly and tilted forward, in which the seat 110 is in the un-sittable configuration. When the seat 110 is in the sittable configuration, the angle subtended by the seat back 110a and the seat pan 110c is a right angle or obtuse angle, and when the seat 110 is in the un-sittable configuration, the angle subtended by the seat back 110a and the seat pan 110c is an acute angle. Put another way, the angle subtended by the seat back 110a and the seat pan 110c is larger when the seat 110 is in the sittable configuration than when the seat 110 is in the un-sittable configuration.

It can be seen that when the seat 106 is in the sittable configuration (as shown in FIGS. 1 to 3), the web 120 is folded and at least part of web 120 extends forward of the plane containing the seat back 106a of the seat 106. The web 120 acts as a separation between the adjacent seats 106, 108 to provide a certain degree of privacy between adjacent passengers on the seats 106, 108.

When the seat 106 is converted from the sittable configuration (as shown in FIGS. 1 to 3) by pivoting the seat back 106a relative to the seat pan 106c to the un-sittable configuration (as shown in FIGS. 4 to 6), while not converting the configuration of the adjacent seat 108, the seating unit 102 may be converted to a business class seat for a passenger on the seat 108. When the seat 106 is in the un-sittable configuration and the seat 108 is in the sittable configuration, the web 120 connecting and between the seat backs 106a, 108a is fully extended. Similarly, when the seat 110 is converted from the sittable configuration (as shown in FIGS. 1 to 3) by pivoting the seat back 110a relative to the seat pan 110c to the unsittable configuration (as shown in FIGS. 4 to 6), the web 122 between and connecting the seat backs 108a, 110a is moved from a folded configuration to a fully extended configuration.

When the seat 106 is converted to the un-sittable configuration, the seat portion 106b (comprising the seat pan 106c and the lower back portion 106d) may be removed from the seat 106 from the lower position as shown in FIGS. 1 to 3, rotated by one hundred and eighty degrees and refitted with the seat 106 between the armrests 112, 116 at an upper position such that a major surface 130 of the seat pan 106c originally facing downward now faces upward and a major surface 132 of the lower back portion 106d originally facing backward (i.e. facing a seat behind the seat 106) now faces forward. When the seat portion 106b is in the upper position, the surface 130 of the seat pan 106c may be co-planar with the upper surfaces of the armrests 112, 116 and the surface 132 of the lower back portion 106d may be co-planar with the front surfaces of the armrests 112, 116. The upwardly facing surface 130 may serve as a table top for use by a passenger occupying the seat 108.

Similarly, when the seat 110 is converted to the un-sittable configuration, the seat portion 110b (comprising the seat pan 110c and the lower back portion 110d) may be removed from the seat 110 from the lower position as shown in FIGS. 1 to 3, rotated by one hundred and eighty degrees and refitted with the seat 110 between the armrests 114, 118 at an upper position such that a major surface 134 of the seat pan 110c originally facing downward now faces upward and a major surface 136 of the lower back portion 110d originally facing backward (i.e. facing a seat behind the seat 110) now faces forward. When the seat portion 110b is in the upper position, the surface 134 of the seat pan 110c may be co-planar with the upper surfaces of the armrests 114, 118 and the surface 136 of the lower back portion 110d may be co-planar with the front surfaces of the armrests 114, 118. The upwardly facing surface 134 may serve as a table for use by a passenger occupying an adjacent seat.

It should also be noted that, and as can best be seen from comparing FIGS. 2 and 5, when the seat portion 110b is moved from its lower position to its upper position, a space 138 between the armrests 118, 114 originally occupiable by a passenger of the seat 110 is now accessible from behind by a passenger occupying a seat 140 immediately behind the seat 110. Similarly, when the seat portion 106b is moved from its lower position to its upper position, a space 142 between the armrests 112, 116 originally occupiable by a passenger of the seat 106 is now accessible from behind by a passenger occupying a seat 144 immediately behind the seat 106.

By way of such an arrangement, when the seat 106 is converted to the un-sittable configuration, forward pivoting of the seat back 106a increases the eye-level room for the passenger occupying the seat 144 behind and more legroom is also provided to the passenger occupying the seat 144 behind by moving the seat portion 106b from its lower position to its upper position. In addition, each of the extended webs 120, 122 (when in the extended configuration) forms a partition that separates the occupants in adjacent seats, in the seats in front and the seats behind. The webs 120, 122 also create additional privacy as they shield the occupants from the eye-sight of passengers in the rows behind.

It should be noted that in the seating unit 102, the seat 108 may be an un-convertible seat (i.e. a seat which cannot be converted between a sittable configuration and an un-sittable configuration as in the case of the seats 106, 110), or may be a convertible seat which may be converted between a sittable configuration and an un-sittable configuration, as in the case of the seats 106, 110.

In addition, although the present invention has thus far been discussed in the context in which both the seating units 102, 104 include at least one convertible seat, it is envisaged that in a seating arrangement according to this invention in which at least two seating units (each including at least two adjacent seats) are arranged side by side with each other or one in front of the other (with all seats facing a same direction), only one of the seating units is a convertible seating unit with at least one convertible seat, and the other seating unit is not a convertible seating unit (i.e. not having any convertible seat).

It should be understood that the above only illustrates and describes an example whereby the present invention may be carried out, and that modifications and/or alterations may be made thereto without departing from the spirit and scope of the invention. It should also be understood that various features of the invention which are, for brevity, described here in the context of a single embodiment, may also be provided separately or in any suitable sub-combination.

The invention claimed is:

1. A seating unit including:
a first seat with a first back member and a first seat pan member which are movable relative to each other to convert said first seat between a first configuration and a second configuration, and
a second seat with a second back member and a second seat pan member which are movable relative to each other to convert said second seat between a first configuration and a second configuration,
wherein said first seat and said second seat are adjacent to each other and face generally a same direction,
wherein an angle subtended by said first back member and said first seat pan member when said first seat is in said first configuration is larger than an angle subtended by said first back member and said first seat pan member when said first seat is in said second configuration,
wherein an angle subtended by said second back member and said second seat pan member when said second seat is in said first configuration is larger than an angle subtended by said second back member and said second seat pan member when said second seat is in said second configuration,
wherein said first back member of said first seat and said second back member of said second seat are joined with each other by a web member, and
wherein when said first seat is in said first configuration and said second seat is in said first configuration, at least part of said web member extends forward of a plane containing said first back member and said second seat back member.

2. A seating unit according to claim 1, wherein when said first seat is in said second configuration, said first seat pan member of said first seat is movable from a lower position to an upper position.

3. A seating unit according to claim 2, wherein, upon movement of said first seat pan member of said first seat from said lower position to said upper position, a space occupiable by a passenger of said first seat is accessible to a passenger in a seat immediately behind said first seat.

4. A seating unit according to claim 1, wherein when said first seat is in its first configuration and said second seat is in its first configuration, said web member is folded, and wherein when one of said first seat and said second seat is in its first configuration and the other of said first seat and said second seat is in its second configuration, said web member is fully extended.

5. A seating unit according to claim 1, wherein said flexible web member is made at least partly of a flexible material.

6. A seating unit according to claim 1, wherein said web member is made at least partly of cloth or leather.

7. A seating arrangement including at least two seating units, wherein one of said seating units is positioned in front of or side by side with the other of said seating units, and wherein at least one of said seating units is a seating unit according to claim 1.

8. A seating unit according to claim 1, wherein said flexible web member is foldable upon itself.

* * * * *